US 8,774,113 B2

(12) United States Patent
Larsson et al.

(10) Patent No.: US 8,774,113 B2
(45) Date of Patent: Jul. 8, 2014

(54) RANDOM ACCESS PROCEDURE UTILIZING CYCLIC SHIFT OF DEMODULATION REFERENCE SIGNAL

(75) Inventors: Daniel Larsson, Solna (SE); Tobias Tynderfeldt, Solna (SE); Fredrik Huss, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 252 days.

(21) Appl. No.: 13/381,750

(22) PCT Filed: Sep. 21, 2009

(86) PCT No.: PCT/SE2009/051046
§ 371 (c)(1),
(2), (4) Date: Dec. 30, 2011

(87) PCT Pub. No.: WO2011/005163
PCT Pub. Date: Jan. 13, 2011

(65) Prior Publication Data
US 2012/0113938 A1    May 10, 2012

Related U.S. Application Data

(60) Provisional application No. 61/223,443, filed on Jul. 7, 2009.

(51) Int. Cl.
*H04W 72/04*    (2009.01)
(52) U.S. Cl.
USPC .................. 370/329; 370/350; 455/422.1

(58) Field of Classification Search
None
See application file for complete search history.

(56) References Cited

U.S. PATENT DOCUMENTS

| | | | | |
|---|---|---|---|---|
| 8,369,269 B2* | 2/2013 | Nakashima et al. | .......... | 370/328 |
| 8,411,664 B2* | 4/2013 | Tynderfeldt et al. | .......... | 370/350 |
| 2006/0009227 A1* | 1/2006 | Cudak et al. | .................. | 455/450 |
| 2008/0165893 A1* | 7/2008 | Malladi et al. | ................. | 375/299 |
| 2009/0191875 A1* | 7/2009 | Vujcic et al. | .................. | 455/436 |

* cited by examiner

*Primary Examiner* — Anh-Vu Ly
*Assistant Examiner* — Hashim Bhatti (57) ABSTRACT

A method and apparatus for accessing a wireless communication system, and for processing random access attempts. A mobile communication device detects random-access information transmitted by a base station, transmits a random-access preamble to the base station according to the random-access information, and receives a random-access response from the base station. The random-access response includes at least an allocation of uplink resources to be used for the next step in the random access procedure. The mobile device also selects a reference signal sequence index from a predetermined set of sequence indexes, and transmits a first message to the base station using the uplink resource allocation provided in the random-access response. The first message includes a device identifier and a first demodulation reference signal derived from a base reference sequence shifted according to the selected sequence index.

28 Claims, 8 Drawing Sheets

RANDOM ACCESS PROCEDURE UTILIZING CYCLIC SHIFT OF DEMODULATION REFERENCE SIGNAL

This application claims the benefit of US Provisional Application No. 61/223,443, filed Jul. 7, 2009, the disclosure of which is fully incorporated herein by reference.

TECHNICAL FIELD

The present invention relates generally to wireless communications systems, and more particularly to techniques and systems for facilitating random access by mobile stations to a shared wireless channel.

BACKGROUND

Figure 1:
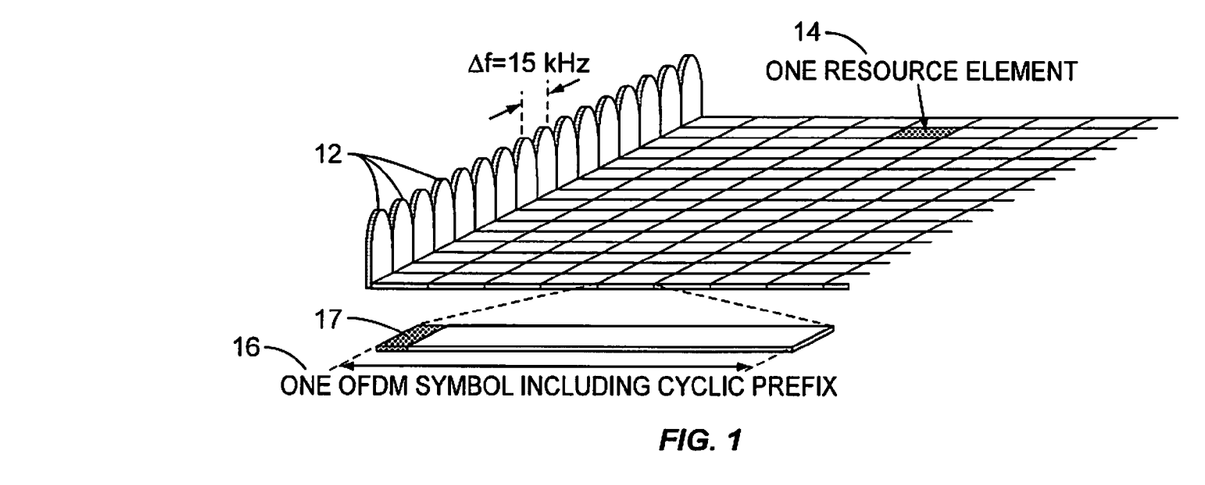
FIG. 1 illustrates the time-frequency structure of an LTE downlink signal.

Long-Term Evolution (LTE) systems, specified by the $3^{rd}$ Generation Partnership Project (3GPP), use Orthogonal Frequency Division Multiplexing (OFDM) for downlink transmissions and discrete-Fourier-transform-spread (DFT-spread) OFDM for uplink transmissions. The basic LTE downlink physical resource can thus be viewed as elements in a time-frequency grid. This time-frequency grid is illustrated in FIG. 1, where each resource element 14 corresponds to a single OFDM subcarrier 12 and a single OFDM symbol interval. The OFDM subcarriers 12 in an LTE signal are spaced at 15 kHz; each OFDM symbol 16 comprises an introductory cyclic prefix 17.

Figure 2:
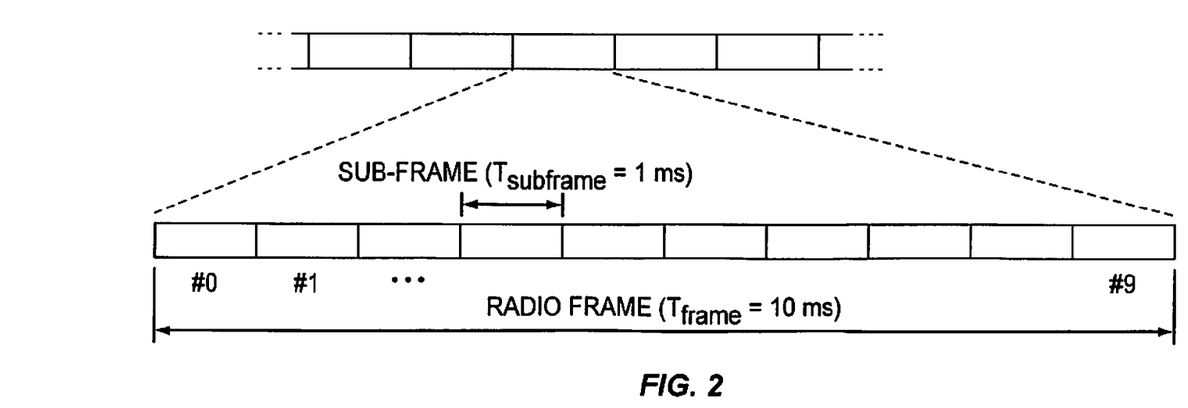
FIG. 2 illustrates the time-domain structure of an LTE downlink signal.

In the time domain, LTE downlink transmissions are organized into radio frames of ten milliseconds, each radio frame consisting of ten one-millisecond subframes. This is illustrated in FIG. 2. Generally, resource allocations in LTE are defined in terms of resource blocks, where a resource block corresponds to one slot (0.5 milliseconds, or one-half of a subframe) in the time domain and twelve contiguous subcarriers in the frequency domain. Resource blocks are individually numbered in the frequency domain, starting with resource block number 0, from one end of the system bandwidth to the other.

Figure 3:
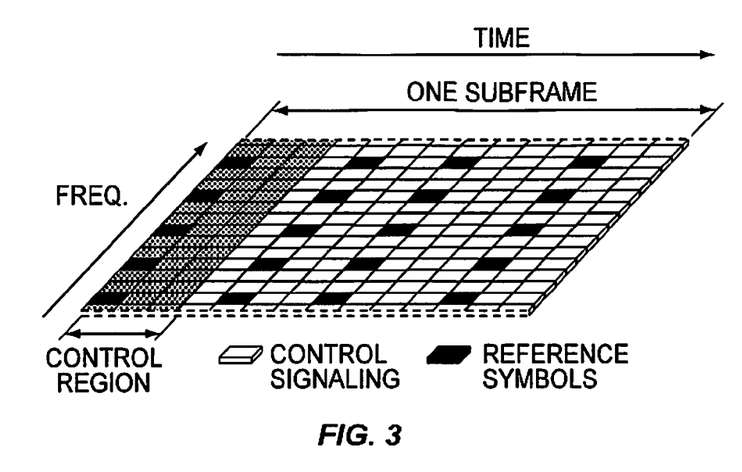
FIG. 3 illustrates details of an LTE downlink subframe.

Downlink transmissions in LTE are dynamically scheduled, in that the base station (known as the evolved-Node B, or eNodeB, in LTE terminology) transmits control information, in each subframe, indicating which mobile stations are scheduled to receive data in the current downlink subframe and further indicating which resource blocks are used for a given mobile station's data. This control signaling is typically transmitted in the first one, two, three, or four OFDM symbols in each subframe. A portion of a downlink OFDM subframe for a system using three OFDM symbols for the control region is illustrated in FIG. 3. FIG. 3 also illustrates that reference symbols, used by the mobile station for channel estimation, channel quality measurements, and cell search and acquisition procedures, are dispersed at various intervals throughout the downlink time-frequency grid.

LTE uses an error control technique known as hybrid-automatic-repeat-request (hybrid-ARQ, or HARQ) for detecting and correcting transmission errors at the medium access control (MAC) protocol layer. Thus, after receiving downlink data in a given subframe, a mobile station attempts to decode it and reports to the base station whether or not the decoding was successful, using an acknowledgement message (ACK) or negative acknowledgement message (NACK), respectively. In the event of an unsuccessful decoding attempt, indicated by receipt of a NACK, the base station can retransmit the erroneous data.

Figure 4:
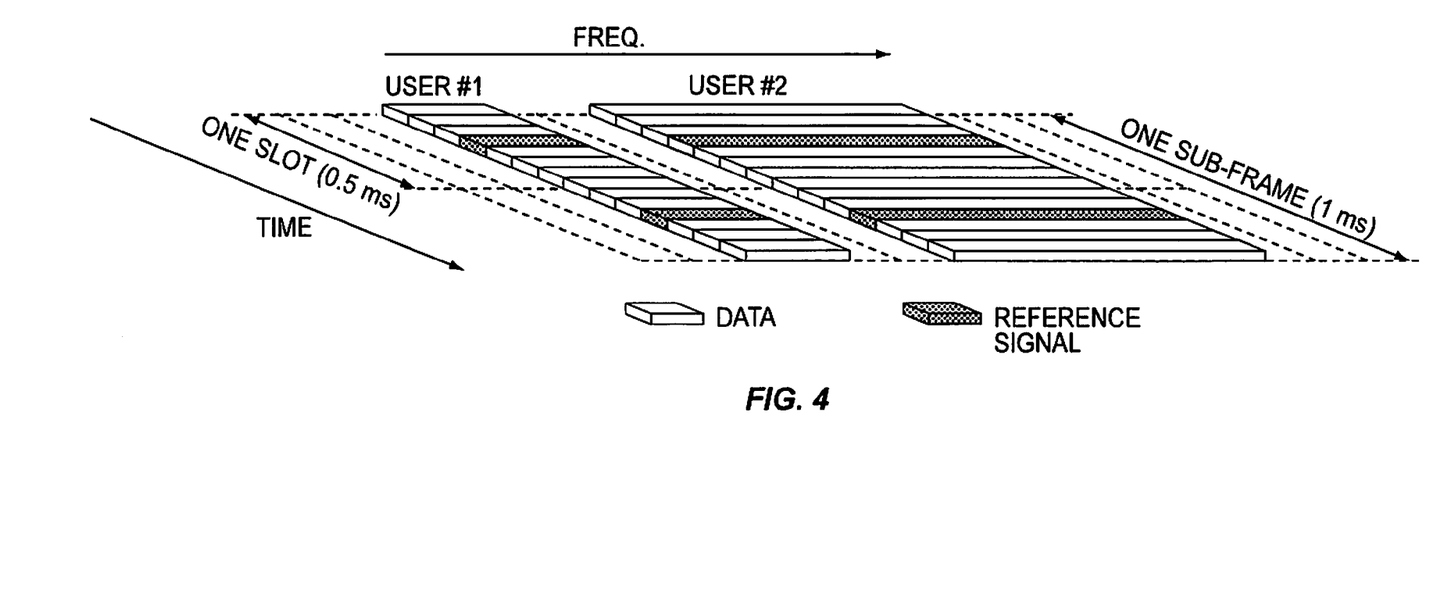
FIG. 4 illustrates the mapping of data and demodulation reference signals to an uplink LTE signal.

Uplink control signaling from a mobile station to the base station includes HARQ acknowledgements for received downlink data, terminal reports related to the downlink channel conditions (used by the base station as assistance for the downlink scheduling), and scheduling requests, which indicate that the mobile station needs uplink resources for uplink data transmissions. To transmit data in the uplink, a mobile terminal generally must first be assigned an uplink resource for data transmission, on the Physical Uplink Shared Channel (PUSCH). In contrast to a resource assignment in downlink, a given allocation of uplink time-frequency resources must always be limited to a single contiguous range of resource blocks; this is necessary to maintain desired signal properties for the uplink transmissions. Thus, a given user's uplink resource allocation is uninterrupted in the frequency domain by any other user's allocation, as illustrated in FIG. 4.

In an uplink transmission, the middle SC-FDMA symbol in each slot is used to transmit a reference signal. This is shown in FIG. 4, where the fourth (of seven) OFDM symbols of each slot is used to transmit a reference signal. If the mobile station has been assigned an uplink resource for data transmission, and at the same time instance has control information to transmit, it will transmit the control information along with the data on PUSCH. Two types of reference signals are supported on the LTE uplink: a demodulation reference signal, which is associated with the transmission of uplink data and/or control signaling; and a sounding reference signal, which is not associated with uplink data transmission and is used mainly for channel quality determination if channel dependent scheduling is used.

The demodulation reference signal is generated as the product of a base sequence and a reference signal sequence index, in the frequency domain. The base sequence is constructed from so-called Zadoff-Chu sequences, which have good correlation properties. Specifically, the autocorrelation for a Zadoff-Chu sequence is zero for non-zero delays, and the cross-correlation between different sequences is low. For low bandwidth allocations, computer-generated sequences are used instead, to increase the number of available sequences.

Each of several reference signal sequence indexes, called cyclic shifts in LTE, may be applied to a given base sequence to generate several reference signals that are orthogonal to each other. Based on the cell identity for the serving LTE base station, a random base sequence and sequence shift is selected for each slot, to avoid the use of the same reference signal in two adjacent cells.

When multi-user multiple-input multiple-output (MU-MIMO) transmission is used in the uplink, two or more mobile stations in a given cell may transmit using the same or overlapping frequency resources. In this case, the reference signals for the different users will have different cyclic shifts. As a result, the reference signals are orthogonal, and channel estimation can be performed separately for each user. The particular cyclic shift that a given mobile station should use in generating the reference signal is signaled to the mobile station in the uplink grant sent to the mobile station. This signaled cyclic shift is then added to the random cyclic shift based on the cell identity.

Figure 5:
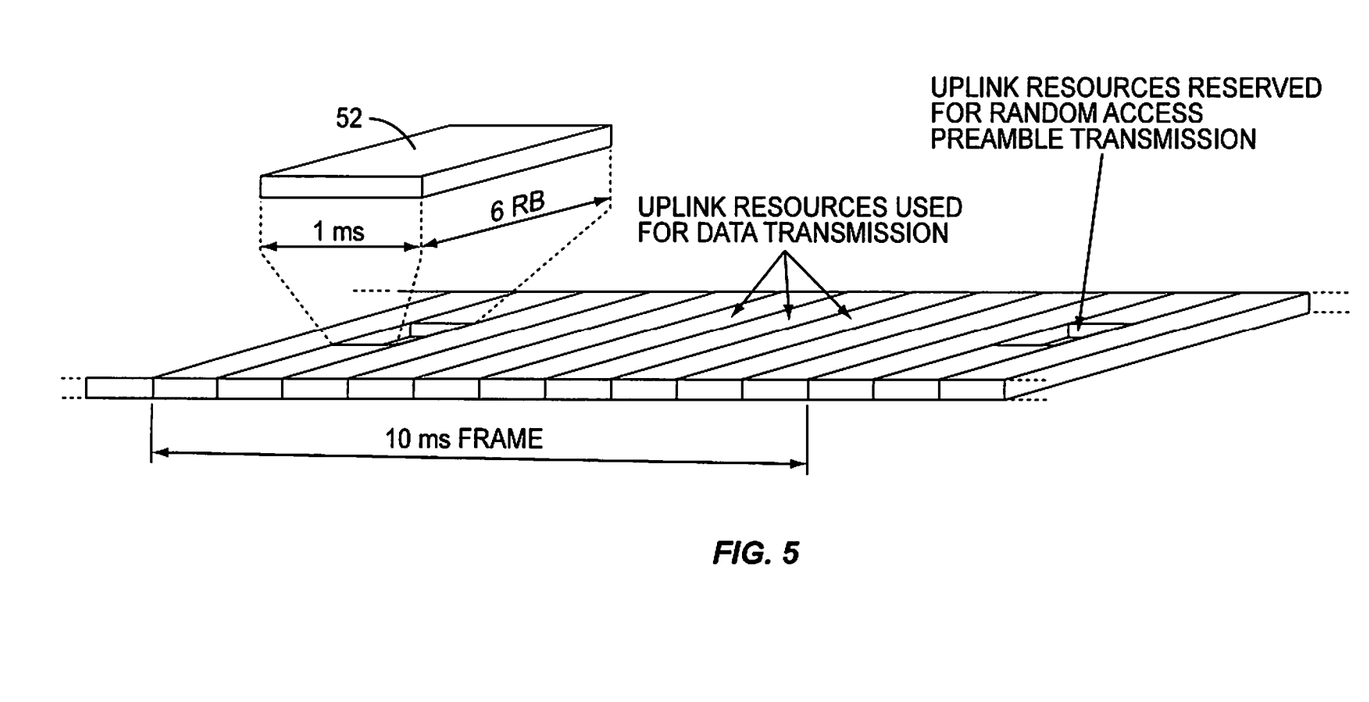
FIG. 5 illustrates the allocation of uplink resources for transmission of random access preambles in an LTE system.

In LTE, as in any communication system, a mobile station may need to initiate a data transfer to the network (via the eNodeB) without already having been assigned uplink resources. To handle this, a random access procedure is available where a mobile station that does not have a dedicated uplink resource may nevertheless transmit a signal to the base station. The first message of this procedure is typically transmitted on a special resource reserved for random access, i.e., a physical random access channel (PRACH). As shown in FIG. 5, the LTE PRACH is a pre-determined group 52 of uplink time-frequency resources, appearing in each frame. In the illustrated scheme, the PRACH 52 comprises six contiguous resource blocks in the frequency domain, over a single one-millisecond subframe. The specific resources available for PRACH transmission are configurable, and are identified to the mobile stations as part of the broadcasted system information (or as part of dedicated radio resource control signaling in the event of handover, for example). In LTE, the random access procedure can be used for a number of different reasons. These reasons include: initial access, such as for mobile stations in idle (LTE_IDLE) or detached (LTE_DETACHED) states; incoming handover; resynchronization of a mobile station; transmission of a scheduling request, such as for a mobile station that is not allocated any other resource for contacting the base station or that has sent the base station a maximum allowed number of scheduling requests without any response from the base station.

Figure 6:
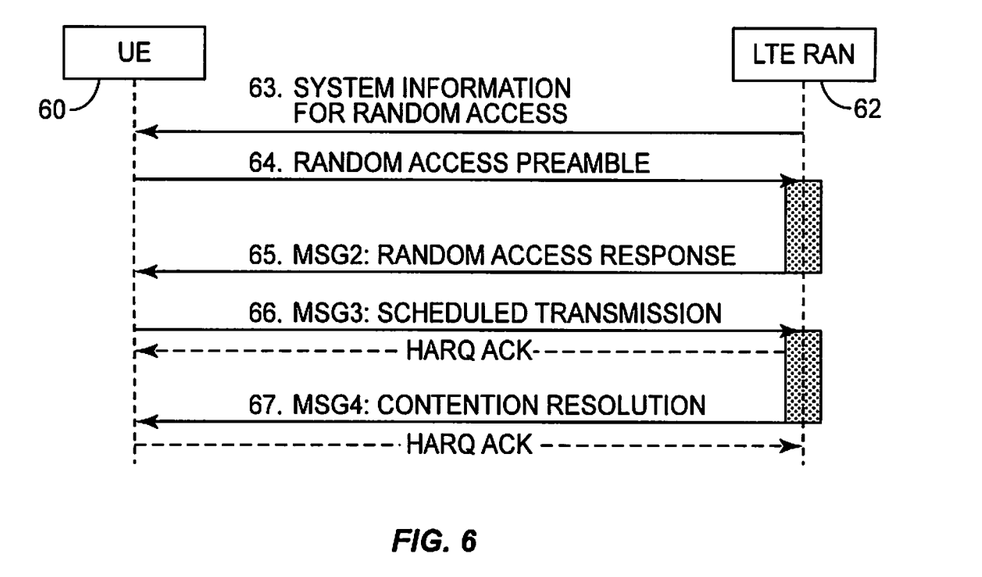
FIG. 6 illustrates an exemplary exchange of messages in a random access attempt.

The contention-based random access procedure specified in LTE is illustrated in FIG. 6. The mobile station 60 (commonly referred to as a UE, or user equipment, in LTE standards) first receives system information for the random access procedures from the LTE Radio Access Network (RAN) 62, as shown at step 63. Later, mobile station 60 initiates the random access procedure by randomly selecting one of several preambles available for contention-based random access, and then transmitting the selected random access preamble on the physical random access channel (PRACH) to eNodeB in RAN 62, as shown at 64. RAN 62 acknowledges any preamble it detects by transmitting a random access response (MSG2), as shown at 65; this random access response includes an initial grant of resources to be used on the uplink shared channel, a temporary C-RNTI, and a time alignment (TA) update based on the timing offset of the preamble measured by the eNodeB.

After receiving the random access response, UE 60 uses the resources specified in the uplink grant to transmit a message (MSG3) that in part is used to trigger the establishment of radio resource control and in part to uniquely identify the UE 60 on the common channels of the cell. The transmission of this message is shown at 66. (Those skilled in the art will note that MSG3 is transmitted on scheduled resources on the transport channel UL-SCH, via physical channel PUSCH, not on PRACH.) The timing alignment command provided in the random access response is applied in the uplink transmission of MSG3.

Figure 7:
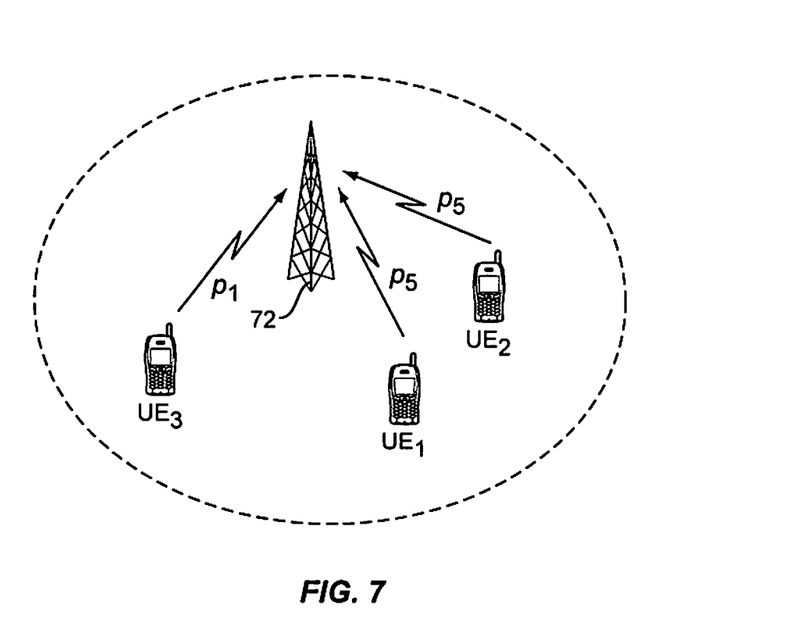
FIG. 7 illustrates contention between two mobile terminals in random access attempts.

The procedure ends with RAN 62 resolving any preamble contention that may have occurred in the event that multiple mobile stations transmitted the same random access preamble at the same time. This can occasionally occur, since each mobile station randomly selects when to transmit and which preamble to use. If multiple mobile stations select the same preamble for the transmission on RACH, there will be contention between these mobile stations—this contention is resolved through a contention resolution message (MSG4) transmitted by the RAN 62, as shown at 67. FIG. 7 illustrates a scenario where contention on the RACH at base station 72 occurs because two mobile stations, UE1 and UE2, each transmit the same preamble, p5, at the same time. A third mobile station, UE3, also transmits a random access preamble at the same time, but since it transmits with a different preamble, p1, there is no contention between UE3 and the other mobile stations.

SUMMARY

In the event that two mobile stations send the same preamble sequence at the same time during random access, both will listen for a random access response to the same preamble. Each mobile station then processes the random access response and transmits a random access message (MSG3, in LTE) according to the uplink grant provided in the random access response. However, in various embodiments of the present invention, each mobile station randomly selects a reference signal sequence index (e.g., a cyclic shift, in LTE) for the demodulation reference signal when transmitting the random access message. This means that if several mobile stations selected the same preamble sequence, it is probable that they will select different demodulation reference signal sequence indexes. The base station node may then distinguish the channel responses associated with each mobile, improving the probability that at least one of the random access messages can be properly demodulated and decoded.

Accordingly, various methods and apparatus for accessing a wireless communications system are disclosed, as well as corresponding methods and apparatus for processing random access attempts in a wireless communications system. In an exemplary method, such as might be implemented in a mobile station, random-access information transmitted by a base station node is detected—this information might specify, for example, uplink time-frequency resources available for random access attempts. The method further includes transmitting a random-access preamble to the base station node according to the random-access information, and receiving a random-access response from the base station node. The random-access response includes at least an allocation of uplink resources to be used for the next step in the random access procedure. The method further includes selecting a reference signal sequence index from a pre-determined set of reference signal sequence indexes, and transmitting a first message to the base station node using the uplink resource allocation provided in the random-access response, the first message comprising a device identifier and a first demodulation reference signal derived from a base reference sequence shifted according to the selected sequence index. In some embodiments, the reference signal sequence index is randomly selected from the pre-determined set of reference signal sequence indexes.

In some embodiments of the invention, the wireless communications system comprises an LTE system and the base station node comprises an LTE eNodeB. In these and other embodiments, the base reference sequence may comprise a Zadoff-Chu sequence. In some embodiments, the method further comprises detecting feedback (such as a NACK) from the base station node, the feedback indicating that the first message was not successfully received, and re-transmitting the first message to the base station node. In these embodiments, the re-transmitted first message includes the device identifier and a second demodulation reference signal derived from a base reference sequence shifted according to the same sequence index shifted earlier.

In some embodiments, the method further comprises determining that an adaptive re-transmission is necessary, based on an uplink resource grant received from the base station node, and transmitting a second message to the base station node according to the uplink resource grant. This second message includes the device identifier and a second demodulation reference signal derived from a base reference sequence shifted according to the selected sequence index. In some of these embodiments, determining that an adaptive re-transmission is necessary comprises determining that the uplink resource grant is addressed to a temporary identifier corresponding to the mobile communications device, evaluating a sequence index indicator included in the uplink resource grant, determining that the adaptive re-transmission is necessary only if the sequence index indicator corresponds to the selected sequence index. In others of these embodiments, determining that an adaptive re-transmission is necessary may instead comprise determining that the uplink resource grant is addressed to a temporary identifier corresponding to the mobile communications device, and determining that the adaptive re-transmission is necessary without regard to a sequence index indicator included in the uplink resource grant.

Methods for processing access attempts from mobile communication devices in a base station node of a wireless communications system are also disclosed. An exemplary method begins with receiving a random-access preamble transmitted to the base station node and then transmitting a random-access response, the random-access response comprising a temporary device identifier and an allocation of uplink resources. The method further comprises receiving an uplink signal comprising messages simultaneously transmitted to the base station node from two or more mobile devices using the allocated uplink resources, deriving a propagation channel estimate corresponding to the allocated uplink resources for each of two or more sequence indexes of a demodulation reference signal, and demodulating a portion of the uplink signal corresponding to the allocated uplink resources using at least the propagation channel estimate that indicates the highest corresponding signal quality (such as signal strength).

In some embodiments, the uplink signal is demodulated using each of the propagation channel estimates that indicates a corresponding signal quality above a pre-determined threshold, while in others the uplink signal is demodulated using propagation channel estimates corresponding to each of a plurality of pre-determined set of sequence indexes for the demodulation reference signal. In still others, the uplink signal corresponding to the allocated uplink resources is demodulated using only the propagation channel estimate that indicates the highest corresponding signal quality. In some of these embodiments, the base station selectively transmits an acknowledgement message or negative acknowledgement corresponding to the sequence index of the demodulation reference signal corresponding to the propagation channel estimate that indicates the highest corresponding signal quality, responsive to a successful or unsuccessful decoding of the message transmitted by one of the two or more mobile devices, respectively. The base station also transmits one or more acknowledgment messages corresponding to one or more additional sequence indexes of the demodulation signal, to prevent automatic retransmissions of messages corresponding to the additional sequence indexes.

In some embodiments, the method further comprises transmitting an uplink resource grant indicating a need for an adaptive re-transmission, responsive to an unsuccessful decoding of the message transmitted by one of the two or more mobile devices. In some of these embodiments, the uplink resource grant includes a designated sequence index, and the method further comprises demodulating a subsequently received re-transmission according to the uplink resource grant using only a propagation channel estimate corresponding to the designated sequence index. In others of these embodiments, the method further comprises demodulating a subsequently received re-transmission according to the uplink resource grant using propagation channel estimates corresponding to two or more sequence indexes of the demodulation reference signal.

Apparatus configured to carry out the methods summarized above are also disclosed, including mobile communications devices configured to access a wireless communications system according to one or more of these techniques, as well as base station nodes configured to process random access attempts according to the disclosed methods. Specific embodiments of these apparatus are configured for operation in an LTE system, as specified by the 3GPP.

The present invention may, of course, be carried out in other ways than those specifically set forth herein without departing from essential characteristics of the invention. Upon reading the following description and viewing the attached drawings, the skilled practitioner will recognize that the described embodiments are illustrative and not restrictive, and that all changes coming within the scope of the appended claims are intended to be embraced therein

DETAILED DESCRIPTION

As discussed above in connection with FIG. 7, in a contention-based random access procedure such as the random access procedure supported by LTE systems, it will occasionally happen that two (or more) mobile stations' random access transmissions "collide," in the sense that both mobile stations select the same contention-based preamble. When this occurs, both contending terminals will listen for a response to the same contention-based preamble. Furthermore, colliding LTE mobiles will subsequently transmit the MSG3 on the same PUSCH resource, since both receive the same uplink grant.

To keep the random access response small and independent of the bandwidth, the uplink grant message transmitted in the LTE random access response has a fixed, limited size. To achieve this, a number of fields present in "normal" uplink grants transmitted on the Physical Downlink Control Channel (PDCCH) are omitted—the mobile station simply uses a pre-determined, or "hard-coded," value for these absent parameters. The parameters omitted from an LTE random access response, compared to a normal uplink grant, include the designation of a demodulation reference signal sequence index, called a cyclic shift in LTE terminology, to be used by the mobile station in subsequent uplink transmissions. Thus, each mobile station simply uses a demodulation reference signal cyclic shift value of zero when transmitting the random access MSG3. As a result, contending terminals in the event of a random access collision will transmit random access MSG3 using the same cyclic shift for the demodulation reference signal.

The overall signal r received by the eNodeB in the uplink resources scheduled for the random access MSG3 includes contributions from all contending mobile stations. For two contending mobile stations UE1 and UE2, this signal can be represented as:

$$r = h_{UE1} * s_{RS0} + h_{UE2} * s_{RS0} + n = (h_{UE1} + h_{UE1}) * s_{RS0} + n, \quad (1)$$

where $h_{UE1}$ is the uplink channel response for mobile station UE1, $h_{UE2}$ is the uplink channel response for UE2, $s_{RS0}$ is the demodulation reference signal with cyclic shift zero, transmitted by both mobile stations, and n represents noise and interference from all sources. The * operator in Equation (1) denotes a convolution operation.

Since both mobile stations are transmitting the same demodulation reference signal, the channel response h estimated by the eNodeB will be an estimate of the "combined" channel response $h_{UE1} + h_{UE2}$. In many cases, this combined channel response will differ so much from any of the actual uplink channel responses that the eNodeB is unable to detect the MSG3 from any of the contending mobile stations. When this happens, both mobile stations wait until a contention resolution timer expires before going back to selecting and transmitting a new contention-based random access preamble. This delay due to contention may be in the order of 100 ms. Accordingly, to keep the average latency of the random access procedure low, the probability of contention must also be kept low.

One approach to reduce the probability of contention is simply to increase the number of random access opportunities, i.e., to increase the uplink time-frequency resources dedicated to random access procedures. However, this comes at the cost of decreased uplink capacity for the PUSCH. Alternatively, the techniques described herein may be used to reduce the occurrences of these delays, without increasing the number of random access opportunities. In particular, the cyclic shift on the reference signal transmitted with the random access MSG3 may be used to reduce the impact of contention between multiple mobile stations. This is achieved by allowing each mobile station to randomly select a cyclic shift (from a set of possible, or permitted, cyclic shifts) to be used when transmitting the demodulation reference signal that accompanies the random access MSG3. As will be shown below, this increases the probability that the MSG3 from at least one mobile station is decoded correctly, reducing the need for time-consuming contention resolution procedures. Indeed, in some embodiments of the inventive methods and apparatus discussed in detail below, it may also be possible to decode the random access MSG3 from each of several contending mobile stations, if each has selected a different cyclic shift.

Thus, in various embodiments of the present invention, the cyclic shift for the demodulation reference signal transmitted by an LTE mobile station during its transmission of the random access MSG3 is utilized to increase the random access capacity for contention based random access. The terminal selects a cyclic shift to use randomly, from a set of available cyclic shifts—this set may include all possible cyclic shifts, in some embodiments, or a more limited, pre-configured set of permitted cyclic shifts in others.

In the event that two mobile stations send the same preamble sequence at the same time during random access, both will listen for a random access response to the same preamble. Each mobile station processes the random access response and transmits the random access MSG3 according to the uplink grant included in the random access response. However, each mobile station randomly selects a cyclic shift for the demodulation reference signal when transmitting random access MSG3. This means that if several mobile stations selected the same preamble sequence, it is probable that they will select different demodulation reference signal cyclic shifts.

In LTE-based implementations of these techniques, each mobile station may then monitor the specific Physical Hybrid-ARQ Indicator Channel (PHICH) resource that corresponds to the selected cyclic shift for HARQ feedback (ACK or NACK). If the mobile station receives NACK, then it performs a HARQ re-transmission of the random access MSG3, using the same cyclic shift as it selected for the initial transmission.

In a system where these techniques are used, the signal r received by the eNodeB in the time-frequency resources scheduled for the random access MSG3 still consists of contributions from all contending mobile stations. However, if it is assumed that two contending mobile stations have selected different cyclic shifts, e.g., UE1 selects $s_{RS0}$ and UE2 selects $s_{RS2}$, then the signal received by the eNodeB is given by:

$$r = h_{UE1} * s_{RS0} + h_{UE2} * s_{RS2} + n \quad (2)$$

where $h_{UE1}$ is the uplink channel response for mobile station UE1, $h_{UE2}$ is the uplink channel response for UE2, and n represents noise and interference.

In this case, it is possible for the eNodeB to separately estimate the channel of UE1 and UE2. This can be done by separately estimating the channel for all allowed cydic shifts for random access MSG3, i.e., using the same set of cyclic shifts from which the mobile station randomly selected a cyclic shift. For example, the channel estimated for cyclic shift 0 will give an estimate of $h_{UE1}$, while the other signal component $h_{UE2} * s_{RS2} + n$ will be seen as interference.

There are a variety of ways that the serving eNodeB can process the received signal. In one approach, the eNodeB is configured to estimate the channel for all cyclic shifts in the set, to estimate a received signal quality (such as signal strength) associated with each cyclic shift, and to then proceed with demodulation and decoding of the received signal using only the "best" channel estimate, i.e., the cyclic shift corresponding to the channel estimate that has the highest signal quality. In some embodiments configured according to this approach, the eNodeB then reports an ACK or NACK on the PHICH resource that corresponds to the selected cyclic shift, depending on whether a MSG3 was successfully decoded. On the PHICH resources corresponding to each of the other cyclic shifts in the allowed set, however, the eNodeB reports ACK, even though no MSG3 corresponding to any of those cyclic shifts was decoded. This effectively suppresses HARQ re-transmissions of MSG3 from mobile terminals that selected a cyclic shift other than the one for which a channel response was used to attempt demodulation and decoding.

In another approach, the eNodeB is configured to estimate the channel response for each of the allowed cyclic shifts, but then proceeds with demodulation and decoding for all of the allowed cyclic shifts. With this approach, it is possible that two or more MSG3s, transmitted along with demodulation reference signals having different cyclic shifts, are successfully decoded. In these embodiments, the eNodeB may be further configured to transmit ACK/NACK feedback on the PHICH resource corresponding to each of the allowed cyclic shifts, depending on whether a corresponding MSG3 was successfully decoded.

In still another approach, the eNodeB is configured to estimate the channel for all cyclic shifts, but then proceeds with demodulation and decoding using only those channel estimates that exceed a certain signal quality threshold, for example a signal strength exceeding a certain pre-determined threshold. In these embodiments, the eNodeB reports ACK/NACK feedback on the PHICH resource for those cyclic shifts corresponding to channel estimates that exceeded the quality threshold. On the PHICH resources corresponding to the other cyclic shifts, the eNodeB reports ACK. Again, this suppresses HARQ re-transmissions of MSG3 by mobile stations that selected a cyclic shift other than those for which channel responses were used for demodulation and decoding.

Although described above in the specific context of a Release 8 LTE system, those skilled in the art will appreciate that the specific techniques may be applied in other wireless communications systems having similar random access procedures. The process flow diagram of FIG. 8 thus illustrates a general method, as implemented in a mobile communications device, for accessing a wireless communications using some of the techniques discussed above.

Figure 8:
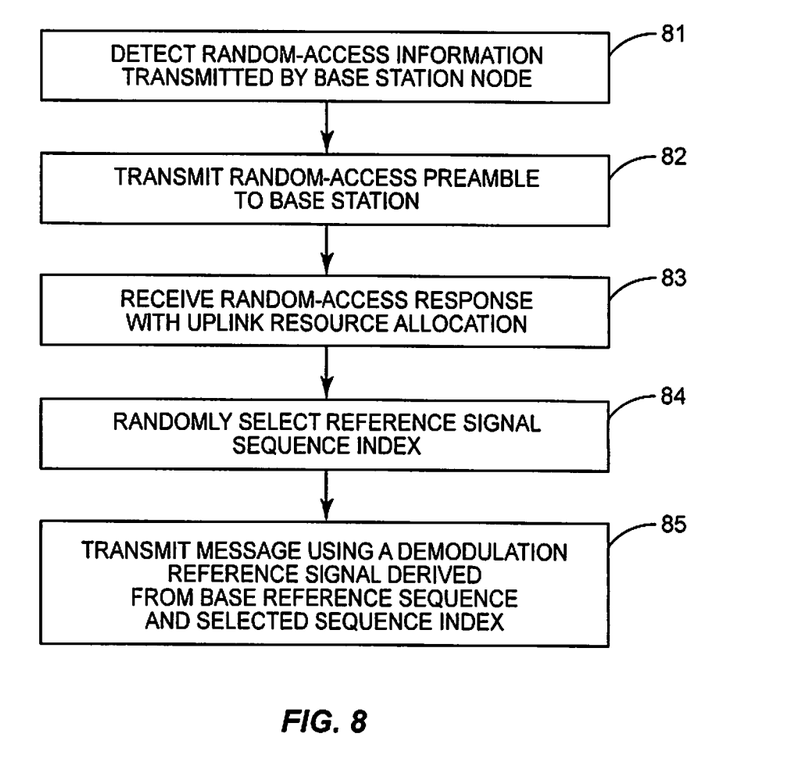
FIG. 8 is a process flow diagram illustrating an exemplary method in a mobile communications device for accessing a wireless communication system.

The illustrated process begins, as shown at block 81, with the detection of random-access information transmitted by a base station node—as discussed earlier, in some embodiments this random-access information defines the specific uplink time-frequency resources set aside for random access transmissions. At some later time, the mobile device determines that it needs to access the wireless network, but does not currently have uplink resources allocated to it. So, the device transmits a random-access preamble to the base station node, according to the random-access information, as shown at block 82.

As shown at block 83, the mobile device receives a random-access response from the base station node, the random-access response comprising an allocation of uplink resources. This random-access response indicates that the base station node detected a random-access preamble, although the mobile device has no way of knowing whether one or more other mobile devices also transmitted a random-access preamble at the same time.

Thus, as shown at block 84, the mobile device randomly selects a reference signal sequence index from a pre-determined set of reference signal sequence indexes. Using the uplink resource allocation provided in the random-access response, the mobile station then transmits a first message to the base station node, the first message comprising a device identifier and a first demodulation reference signal derived from a base reference sequence shifted according to the selected sequence index. As discussed above, transmitting the demodulation reference signal with a randomly selected sequence index allows the receiving base station (under many circumstances) to estimate the channel response specifically corresponding to the mobile device, even in the presence of contending messages from one or more other mobile devices.

Those skilled in the art will appreciate that the selection of the reference signal sequence index from a pre-determined set of reference signal sequence indexes need not be strictly random. Thus, a systematic (non-random) technique for selecting the reference signal sequence index may be used, in some embodiments of the invention. For instance, various techniques may be employed that merely appear to be random (or nearly random) when used by a large number of mobile devices. One such approach is to perform a modulo operation on a mobile device identifier, such as an International Mobile Subscriber Identity (IMSI). Thus, for example, if there are N different reference signal sequence indexes in the pre-determined set, then a mobile device may perform a modulo-N operation on its IMSI (or other identifier) to yield a pointer to the specific index to be used. Although this approach may result in a given mobile device repeatedly selecting the same reference signal sequence index, two or more contending mobile stations are generally just as unlikely to select the same reference signal sequence index using this technique than if the indexes were selected randomly.

In some embodiments of the present invention, a mobile device implementing the method illustrated in FIG. 8 is further configured to subsequently detect feedback from the base station node indicating that the first message was not successfully received, and to re-transmit the first message to the base station node, such that the re-transmitted first message comprises a second demodulation reference signal, i.e., a demodulation reference signal derived from a base sequence and the earlier selected sequence index. In this way, the base station node can send a negative acknowledgement (NACK) corresponding to a specific sequence index, indicating that the base station attempted to decode a message corresponding to this sequence index, but was unsuccessful. This permits the base station node to then "look for" a HARQ re-transmission corresponding to that same sequence index, and, for example, combine soft data from the first decoding attempt with soft data obtained from the re-transmission.

In an LTE system, of course, the base station node discussed above comprises an LTE eNodeB, and the "first message" discussed above includes the LTE MSG3 and a demodulation reference signal formed from a Zadoff-Chu sequence shifted by the randomly selected sequence index. However, those skilled in the art will appreciate that other formats for this message are possible.

Figure 9:
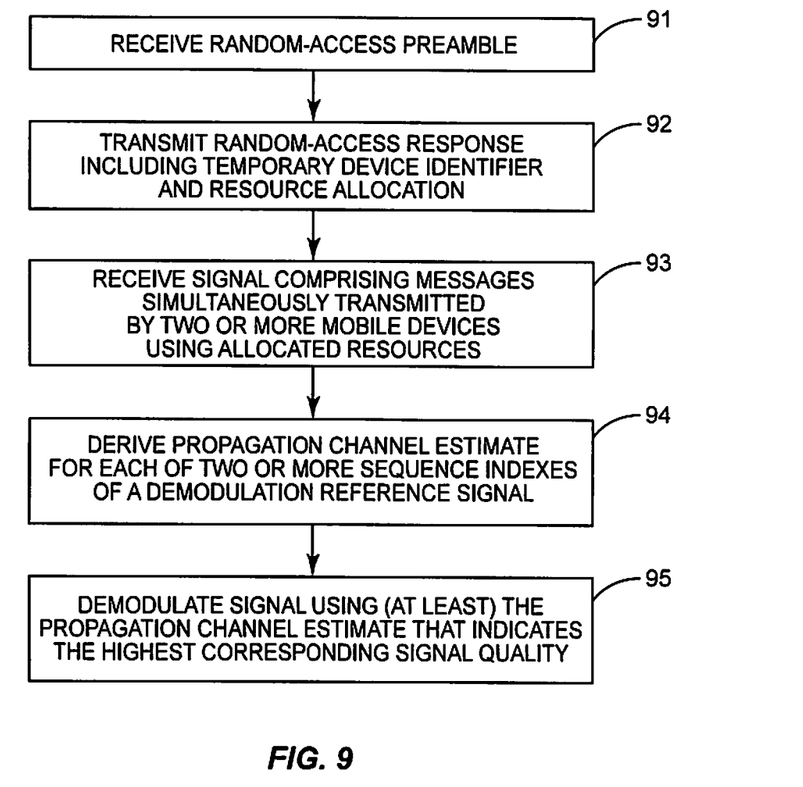
FIG. 9 is a process flow diagram illustrating an exemplary method for processing random access attempts in a base station.

The process flow diagram of FIG. 9 illustrates a method for implementation in a base station node, generally corresponding to the above device-based method. Thus, FIG. 9 illustrates a general method for processing access attempts from mobile communication devices in a wireless communications system that supports random access.

The illustrated method begins, as shown at block 91, with the receiving of a random-access preamble transmitted to the base station node. At this point, the base station node is unaware of whether two or more mobile stations have simultaneously transmitted the random-access preamble, and are thus contending for access. As shown at block 92, the base station responds by transmitting a random-access response, which includes a temporary device identifier and an allocation of uplink resources. To this point, the illustrated method is the same as currently specified for random access procedures in LTE.

As shown at block 93, however, the base station node then receives a signal in the allocated uplink resources) comprising messages simultaneously transmitted to the base station node from two or more mobile devices using the uplink resources allocated in the random-access response. The base station node then derives a propagation channel estimate corresponding to the allocated uplink resources for each of two or more sequence indexes of a demodulation reference signal, as shown at block 94, and demodulates a portion of the uplink signal corresponding to the allocated uplink resources, using at least the propagation channel estimate that indicates the highest corresponding signal quality, as shown at block 95.

Figure 10:
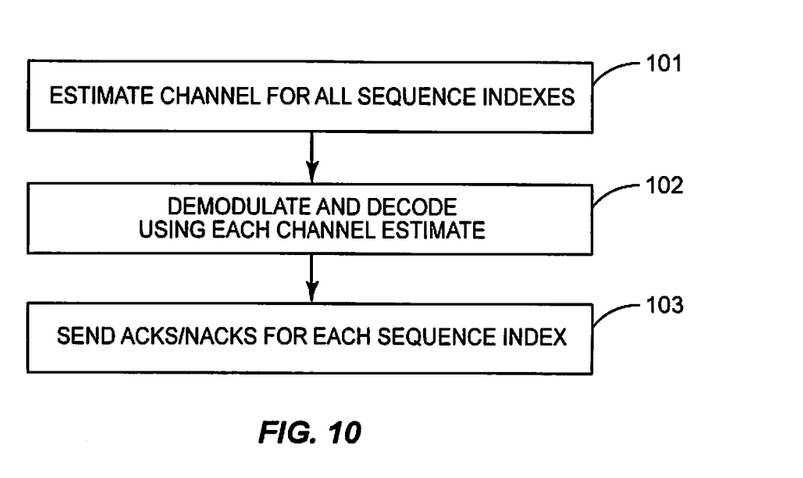
FIGS. 10, 11, and 12 illustrate alternative methods for processing contending access messages from mobile terminals.

In some embodiments, as discussed above, the base station node is configured to estimate the channel response corresponding to all allowed sequence indexes of the demodulation reference signal, as shown in FIG. 10, at block 101, and to attempt to demodulate and decode a random access message using each channel estimate, as shown at block 102. In these embodiments, an acknowledgement or negative acknowledgement, as appropriate, is transmitted for each of the allowed sequence indexes, as shown at block 103. In LTE systems, this is done by sending the ACK/NACK indicator using the PHICH resource corresponding to each cyclic shift.

Figure 11:
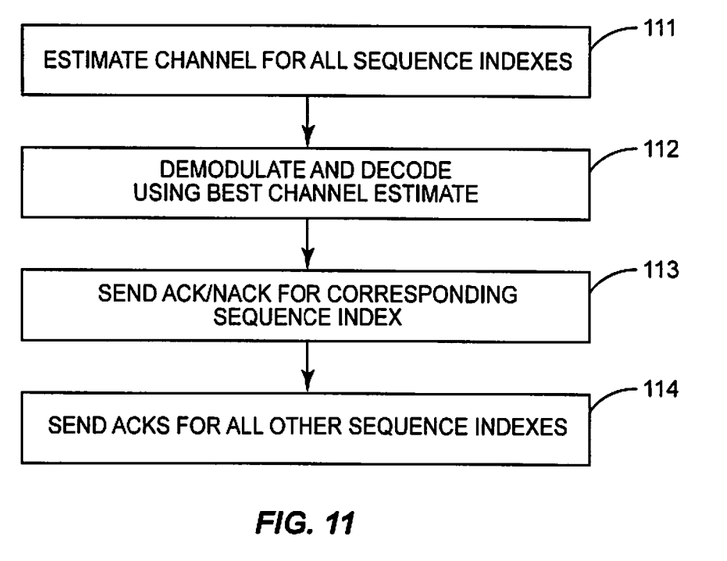

FIG. 11 illustrates an alternative approach to that shown in FIG. 10. In embodiments according to the sub-flow of FIG. 11, a channel response is estimated for all allowed sequence indexes, as shown at block 111, but the base station node attempts to demodulate and decode a random access message, as shown at block 112, using only the "best" channel estimate, e.g., the channel estimate that indicates the highest signal strength. As shown at block 113, the base station node sends an ACK or NACK, depending on whether or not the decoding was successful, using the feedback channel resource corresponding to the sequence index that yielded the best channel response. The base station node also sends an ACK indicator for all other (allowed) sequence indexes, as shown at block 114, thus suppressing any automatic re-transmissions from mobile stations that might have transmitted a random access message using a sequence index that did not yield the "best" channel response.

Figure 12:
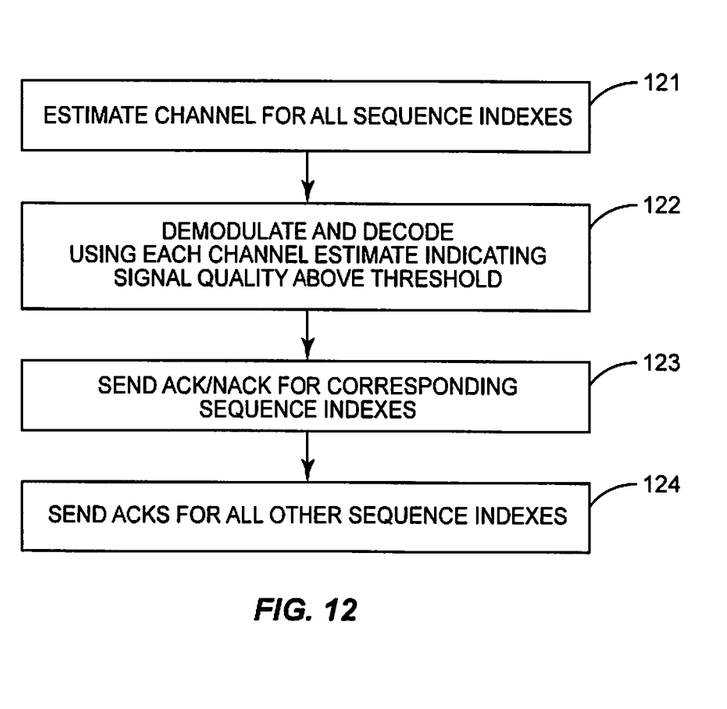

FIG. 12 illustrates an approach that might be viewed as a compromise between the approaches pictured in FIGS. 10 and 11. As was the case with the previous process flows, the process flow of FIG. 12 begins, as shown at block 121, with the estimating of a channel response for each allowed sequence index. The resulting channel response estimates are then evaluated, e.g., according to their signal quality. The base station node then attempts to demodulate and decode the signal received on the allocated uplink resources using the channel response estimates that have a signal quality exceeding a pre-determined threshold, as shown at block 122. An ACK or NACK, as appropriate, is sent using the HARQ indicator channel resources corresponding to each sequence index for which the corresponding channel response estimate was used, as shown at block 123; an ACK is sent for all other allowed sequence indexes, as shown at block 124. Of course, a base station in some cases may be configured with an upper limit on the number of demodulations it will perform—for example, a maximum of three demodulations. In this case, if the number of channel estimates exceeding the quality threshold is two, then the base station demodulates both. However, if the number of channel estimates exceeding the threshold is four, then the base station only proceeds to demodulate the three having the best signal qualities.

In an LTE system configured according to any of the above embodiments of the invention, a mobile station attempting a random access determines the need for a non-adaptive HARQ re-transmission of the random access message based on the ACK/NACK reported on the PHICH resource corresponding to the randomly selected cyclic shift. In the event that a NACK is indicated, then the re-transmission on the uplink shared channel (UL-SCH) is performed using the same resource allocation provided by the base station node in the initial random access response. However, the LTE standard also allows adaptive HARQ re-transmissions, which are triggered by sending an explicit uplink resource grant, addressed to a specific mobile station, on the Physical Downlink Control Channel (PDCCH). To trigger an adaptive re-transmission of the random access MSG3, the eNodeB sends an uplink resource grant to the temporary C-RNTI assigned in the random access response message for the random access MSG3 transmission. Of course, two or more contending mobile stations have the same temporary C-RNTI, as each will have received the same random access response. Thus, two or more contending mobile stations may be simultaneously monitoring the PDCCH for uplink grants addressed to the same temporary C-RNTI.

Since the adaptive HARQ re-transmission is triggered by a "normal" uplink grant on PDCCH, the demodulation reference signal cyclic shift to be used by the mobile station when using the allocated resources will be specifically indicated in the uplink grant. There are several options for how to handle (and exploit) this, in various embodiments of the invention.

One option is that all (of two or more contending) mobile stations ignore the indicated cyclic shift field in uplink grants for adaptive re-transmissions of random access MSG3, i.e., when the UE has a temporary C-RNTI configured. These mobile stations adapt the re-transmission according to the uplink grant, which could for example indicate that the UL-SCH shall be transmitted on different PUSCH resources. However, these mobile stations continue to use the cyclic shift selected for the initial transmission of random access MSG3 for the adaptive re-transmissions as well. In this case, the adaptive retransmissions will also collide. However, the eNodeB can still separately estimate channel response estimates for each cyclic shift, and attempt to demodulate and decode the adaptive re-transmissions using the corresponding channel response estimates. In some embodiments according to this approach, the coding of the adaptive re-transmission may be made more robust, to account for the increased interference resulting from a competing re-transmission in the same uplink resources.

A second approach is for each mobile station to assume that an adaptive uplink grant is only valid for the mobile station that earlier selected the cyclic shift that is now signaled in the uplink grant. Thus, only the mobile station (or mobile stations, in the rare case where two mobile stations randomly select the same cyclic shift) that selected that cyclic shift for the initial transmission will adapt its UL-SCH re-transmission according to the uplink grant. Any mobile station that selected a different cyclic shift for the initial transmission ignores the uplink grant and performs any re-transmission only as indicated by PHICH feedback for that cyclic shift. This approach has the benefit that the eNodeB can detect that there is contention and then assign different PUSCH resources for the different cyclic shifts. In the event of two contending mobile stations, for example, one can be directed to perform an adaptive re-transmission by indicating its cyclic shift in the uplink grant. The other can be instructed to perform a non-adaptive re-transmission via a NACK sent on the PHICH resource corresponding to its selected cyclic shift.

Contention between mobile stations that have selected the same preamble is generally done by identifying the mobile station for which a random access MSG3 has been decoded. The mobile station that detects a contention resolution indicator targeted to the mobile station identifier that the mobile station previously transmitted in MSG3 determines that it has won the contention. In LTE, there are two solutions for the eNodeB to indicate contention resolution. One method is used for mobile stations whose identity is already known in the cell prior to the random access, i.e., mobile stations that have been assigned a C-RNTI for the cell. A second method is used for mobile stations that do not have a valid C-RNTI for the cell, e.g., mobile stations attempting initial access or connection re-establishment.

For mobile stations that already have a C-RNTI, contention is resolved by an uplink grant on PDCCH to the normal C-RNTI of the UE. In the event that the eNodeB initiated the random access via PDCCH order, contention can also be resolved through a downlink assignment on PDCCH to the normal C-RNTI. For mobile stations that do not have a C-RNTI, contention is resolved through a downlink shared channel (DL-SCH) message containing the mobile station identifier that was transmitted in MSG3. The downlink assignment for this DL-SCH message is send on PDCCH, and is addressed to the temporary C-RNTI. If the eNodeB successfully decodes random access MSG3 from contending mobile stations that have selected different cyclic shifts, it is thus possible within the current LTE standard to resolve contention as long as at most one of the contending mobile stations does not have a valid C-RNTI for the cell.

Figure 13:
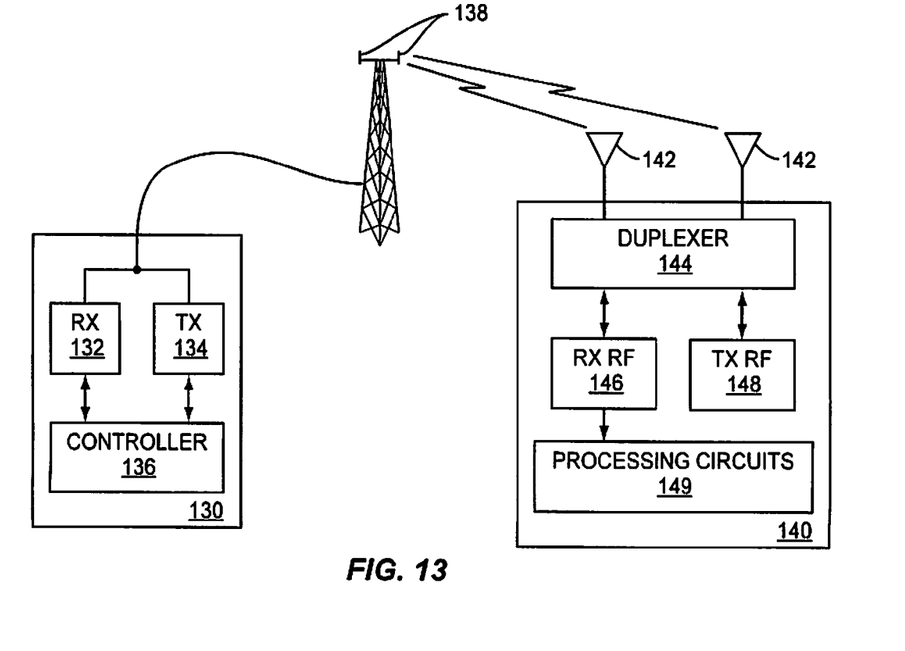
FIG. 13 illustrates an exemplary communication system, including a mobile terminal and a base station configured according to some embodiments of the present invention.

Those skilled in the art will appreciate that embodiments of the present invention include not only the methods described above and illustrated in FIGS. 8 through 12 (as well as variants thereof), but also include corresponding mobile devices and base station nodes configured to implement one or more of those methods. FIG. 13 is a simplified diagram of a wireless communications network according to some embodiments, including a base station node 130, connected to antennas 138, and a mobile device 140. Base station node 130 includes a receiver (RX) subsystem 132, a transmitter (TX) subsystem 134, and controller 136—each of these subsystems may be adapted, according to techniques well known in the art, to support one or more wireless communications standards such as the LTE standard promulgated by 3GPP. Likewise, mobile device 140 includes antennas 142, duplexer 144 (which may include a frequency duplexer, for FDD configurations, or one or more switches, for TDD configurations), RX radio-frequency (RF) section 146, TX RF section 148, and processing circuits 149. Again, these subsystems are designed to comply with one or more wireless communications standards, such as LTE. As the general design of these systems is well known to those skilled in the art, further details of most of these subsystems are not provided herein.

Figure 14:
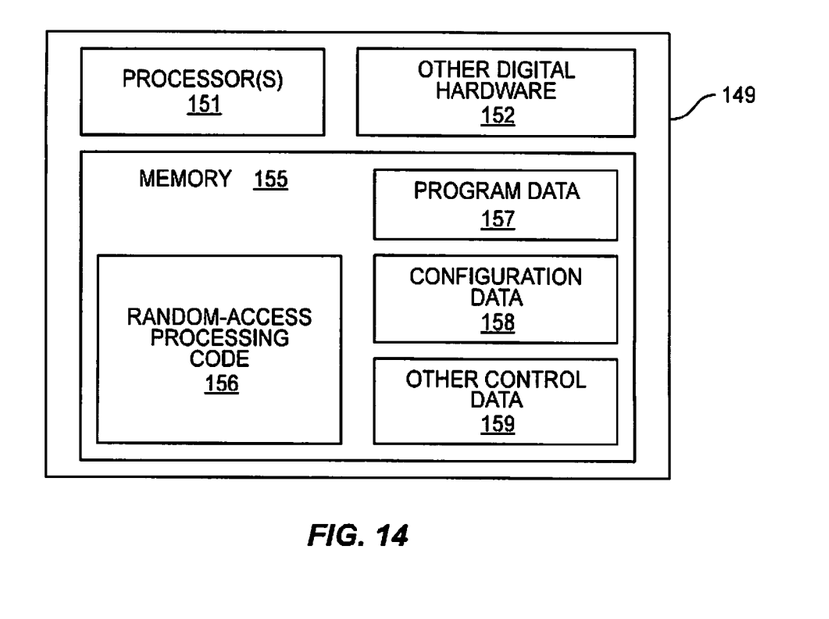
FIG. 14 illustrates an exemplary processing circuit.

Indeed, those skilled in the art will readily appreciate that, in several embodiments of base station nodes and mobile stations, one or more of the techniques described in detail above are implemented using one or more appropriately programmed microprocessors, in some cases supplemented with special-purpose hardware. An exemplary processing circuit 149 is pictured in FIG. 14; controller 136 may comprise similar circuitry. Processing circuit 149 includes one or more processors 151 (e.g., one or more microprocessors, microcontrollers, and/or digital signal processors), and other digital hardware 152 (e.g., special-purpose logic, communications interfaces, and the like), any or all of which may be configured with software and/or firmware stored in memory 155. In the pictured embodiment, memory 155 is configured to store software, including random-access processing code 156, which comprises program instructions for use by processor(s) 151 in carrying out one or more of the techniques described above. Memory 155 may also include other program code (not pictured), which may include program instructions for generally operating the mobile device 140 and its user interfaces, implementing one or more communications protocol stacks, controlling RX RF section 146 and TX RF section 148, and the like. Finally, memory 155 includes program data 157, configuration data 158, and other control data 159, such as in a random-access memory (RAM) or flash memory device.

More generally, those skilled in the art will appreciate that processing circuit 149 may comprise any of a variety of physical configurations, such as in the form of one or more application-specific integrated circuits (ASICs). In some embodiments, these processing circuits may comprise customized hardware to carry out one or more of the functions described above. Other embodiments of the invention may include computer-readable devices, such as a programmable flash memory, an optical or magnetic data storage device, or the like, encoded with computer program instructions which, when executed by an appropriate processing device, cause the processing device to carry out one or more of the techniques described herein.

Those skilled in the art will appreciate that the various techniques and apparatus described above may be used to enable a higher load for contention-based random access, without increasing the number of random access possibilities (and commensurately increasing the uplink resources dedicated to random access procedures). In the event that two mobile stations send the same preamble sequence at the same time during random access, these techniques will enable both mobile stations to successfully proceed with the random access procedure in many cases. Of course, those skilled in the art will also recognize that the present invention may be carried out in other ways than those specifically set forth herein without departing from essential characteristics of the invention. The present embodiments are thus to be considered in all respects as illustrative and not restrictive, and all changes coming within the scope of the appended claims are intended to be embraced therein.

What is claimed is:

1. A method in a mobile communication device for accessing a wireless communication system, the method comprising detecting random-access information transmitted by a base station node, transmitting a random-access preamble to the base station node according to the random-access information, and receiving a random-access response from the base station node, the random-access response including an allocation of uplink resources, wherein an improvement comprises:

selecting by the mobile communication device, a reference signal sequence index from a pre-determined set of reference signal sequence indexes;

transmitting a first message to the base station node using the uplink resource allocation provided in the random-access response, the first message comprising a device identifier for the mobile communication device and a first demodulation reference signal derived from a base reference sequence shifted according to the selected sequence index;

detecting feedback from the base station node indicating that the first message was not successfully received; and re-transmitting the first message to the base station node, the re-transmitted first message comprising a second demodulation reference signal shifted according to the selected sequence index.

2. The method of claim 1, wherein the step of selecting a reference signal sequence index from a pre-determined set of reference signal sequence indexes comprises randomly selecting the reference signal sequence index from the pre-determined set.

3. The method of claim 1, wherein the wireless communication system comprises a Long Term Evolution (LTE) system and the base station node comprises an LTE eNodeB, and wherein the first demodulation reference signal is shifted according to a cyclic shift corresponding to the selected sequence index.

4. A method in a mobile communication device for accessing a wireless communication system, the method comprising detecting random-access information transmitted by a base station node, transmitting a random-access preamble to the base station node according to the random-access information, and receiving a random-access response from the base station node, the random-access response including an allocation of uplink resources, wherein an improvement comprises:

selecting by the mobile communication device, a reference signal sequence index from a pre-determined set of reference signal sequence indexes;

transmitting a first message to the base station node using the uplink resource allocation provided in the random-access response, the first message comprising a device identifier for the mobile communication device and a first demodulation reference signal derived from a base reference sequence shifted according to the selected sequence index;

determining that an adaptive re-transmission is necessary, based on an uplink resource grant received from the base station node; and transmitting a second message to the base station node according to the uplink resource grant, the second message comprising the device identifier and a second demodulation reference signal derived from a base reference sequence shifted according to the selected sequence index.

5. The method of claim 4, wherein the step of determining that an adaptive re-transmission is necessary comprises:

determining that the uplink resource grant is addressed to a temporary identifier corresponding to the mobile communication device;

evaluating a sequence index indicator included in the uplink resource grant; and determining that the adaptive re-transmission is necessary only if the sequence index indicator corresponds to the selected sequence index.

6. The method of claim 4, wherein the step of determining that an adaptive re-transmission is necessary comprises:

determining that the uplink resource grant is addressed to a temporary identifier corresponding to the mobile communication device; and determining that the adaptive re-transmission is necessary without regard to a sequence index indicator included in the uplink resource grant.

7. A mobile communication device for use in a wireless communication system, the mobile communication device comprising a transmitter circuit, a receiver front-end circuit, and one or more processing circuits configured to detect random-access information transmitted by a base station node, transmit a random-access preamble to the base station node according to the random-access information, and receive a random-access response from the base station node, the random-access response comprising an allocation of uplink resources, wherein the one or more processing circuits are further configured to:

select a reference signal sequence index from a pre-determined set of reference signal sequence indexes;

transmit a first message to the base station node using the uplink resource allocation provided in the random-access response, the first message comprising a device identifier for the mobile communication device and a first demodulation reference signal derived from a base reference sequence shifted according to the selected sequence index;

detect feedback from the base station node indicating that the first message was not successfully received; and re-transmit the first message to the base station node, the re-transmitted first message comprising a second demodulation reference signal shifted according to the selected sequence index.

8. The mobile communication device of claim 7, further characterized in that the one or more processing circuits are configured to randomly select the reference signal sequence index from the pre-determined set of reference signal indexes.

9. The mobile communication device of claim 7, wherein the wireless communication system comprises a Long Term Evolution (LTE) system and the base station node comprises an LTE eNodeB, and wherein the first demodulation reference signal is shifted according to a cyclic shift corresponding to the selected sequence index.

10. A mobile communication device for use in a wireless communication system, the mobile communication device comprising a transmitter circuit, a receiver front-end circuit, and one or more processing circuits configured to detect random-access information transmitted by a base station node, transmit a random-access preamble to the base station node according to the random-access information, and receive a random-access response from the base station node, the random-access response comprising an allocation of uplink resources, wherein the one or more processing circuits are further configured to:

select a reference signal sequence index from a pre-determined set of reference signal sequence indexes;

transmit a first message to the base station node using the uplink resource allocation provided in the random-access response, the first message comprising a device identifier for the mobile communication device and a first demodulation reference signal derived from a base reference sequence shifted according to the selected sequence index;

determine that an adaptive re-transmission is necessary, based on an uplink resource grant received from the base station node; and transmit a second message to the base station node according to the uplink resource grant, the second message comprising the device identifier and a second demodulation reference signal derived from a base reference sequence shifted according to the selected sequence index.

11. The mobile communication device of claim 10, wherein the one or more processing circuits are configured to determine that an adaptive re-transmission is necessary by:

determining that the uplink resource grant is addressed to a temporary identifier corresponding to the mobile communication device;

evaluating a sequence index indicator included in the uplink resource grant; and determining that the adaptive re-transmission is necessary only if the sequence index indicator corresponds to the selected sequence index.

12. The mobile communication device of claim 10, wherein the one or more processing circuits are configured to determine that an adaptive re-transmission is necessary by:

determining that the uplink resource grant is addressed to a temporary identifier corresponding to the mobile communication device; and determining that the adaptive re-transmission is necessary without regards to a sequence index indicator included in the uplink resource grant.

13. A method in a base station node for processing access attempts from mobile communication devices in a wireless communication system, the method comprising receiving a random-access preamble transmitted to the base station node and transmitting a random-access response from the base station node, the random-access response comprising a temporary device identifier and an allocation of uplink resources, wherein an improvement comprises:

receiving an uplink signal comprising messages simultaneously transmitted to the base station node from two or more mobile communication devices using the allocated uplink resources;

deriving a propagation channel estimate corresponding to the allocated uplink resources for each of two or more sequence indexes of a demodulation reference signal; and demodulating a portion of the uplink signal corresponding to the allocated uplink resources using at least the propagation channel estimate that indicates a highest corresponding signal quality.

14. The method of claim 13, wherein the step of demodulating the portion of the uplink signal corresponding to the allocated uplink resources comprises demodulating the uplink signal using each of the propagation channel estimates that indicates a corresponding signal quality above a pre-determined threshold.

15. The method of claim 13, wherein the step of demodulating the portion of the uplink signal corresponding to the allocated uplink resources comprises demodulating the uplink signal using propagation channel estimates corresponding to each of a plurality of pre-determined set of reference signal sequence indexes for the demodulation reference signal.

16. The method of claim 13, wherein the method comprises demodulating a portion of the uplink signal corresponding to the allocated uplink resources using only the propagation channel estimate that indicates the highest corresponding signal quality, and further comprises:

selectively transmitting an acknowledgement message or negative acknowledgement corresponding to the sequence index of the demodulation reference signal corresponding to the propagation channel estimate that indicates the highest corresponding signal quality, responsive to a successful or unsuccessful decoding of the message transmitted by one of the two or more mobile communication devices, respectively; and transmitting one or more acknowledgment messages corresponding to one or more additional sequence indexes of the demodulation signal, to prevent automatic retransmissions of messages corresponding to the additional sequence indexes.

17. The method of claim 13, wherein the method comprises demodulating a portion of the uplink signal corresponding to the allocated uplink resources using propagation channel estimates corresponding to each of two or more selected sequence indexes of the demodulation reference signal, and further comprises:

selectively transmitting an acknowledgement message or a negative acknowledgement message corresponding to each of the two or more selected sequence indexes, responsive to a successful or unsuccessful decoding of an uplink message using the corresponding propagation channel estimate, respectively; and transmitting one or more acknowledgment messages corresponding to one or more additional sequence indexes of the demodulation signal, to prevent automatic retransmissions of messages corresponding to the additional sequence indexes.

18. The method of claim 13, further comprising:

transmitting an uplink resource grant indicating a need for an adaptive re-transmission, responsive to an unsuccessful decoding of the message transmitted by one of the two or more mobile communication devices.

19. The method of claim 18, wherein the uplink resource grant includes a designated sequence index, and the method further comprises demodulating a subsequently received re-transmission according to the uplink resource grant using only a propagation channel estimate corresponding to the designated sequence index.

20. The method of claim 18, further comprising demodulating a subsequently received re-transmission according to the uplink resource grant using propagation channel estimates corresponding to two or more sequence indexes of the demodulation reference signal.

21. A base station node for use in a wireless communications system, the base station node comprising:

a transmitter circuit;

a receiver front-end circuit; and one or more processing circuits configured to:

receive a random-access preamble transmitted to the base station node;

transmit a random-access response from the base station node, the random-access response comprising a temporary device identifier and an allocation of uplink resources;

receive an uplink signal comprising messages simultaneously transmitted to the base station node from two or more mobile communication devices using the allocated uplink resources;

derive a propagation channel estimate corresponding to the allocated uplink resources for each of two or more sequence indexes of a demodulation reference signal; and demodulate a portion of the uplink signal corresponding to the allocated uplink resources using at least the propagation channel estimate that indicates the highest corresponding signal quality.

22. The base station node of claim 21, wherein the one or more processing circuits are configured to demodulate the portion of the uplink signal corresponding to the allocated uplink resources by demodulating the uplink signal using each of the propagation channel estimates that indicates a corresponding signal quality above a pre-determined threshold.

23. The base station node of claim 21, wherein the one or more processing circuits are configured to demodulate the portion of the uplink signal corresponding to the allocated uplink resources by demodulating the uplink signal using propagation channel estimates corresponding to each of a plurality of pre-determined set of sequence indexes for the demodulation reference signal.

24. The base station node of claim 21, wherein the one or more processing circuits are configured to demodulate a portion of the uplink signal corresponding to the allocated uplink resources using only the propagation channel estimate that indicates the highest corresponding signal quality, and are further configured to:

selectively transmit an acknowledgement message or negative acknowledgement corresponding to the sequence index of the demodulation reference signal corresponding to the propagation channel estimate that indicates the highest corresponding signal quality, responsive to a successful or unsuccessful decoding of the message transmitted by one of the two or more mobile devices, respectively; and transmit one or more negative acknowledgment messages corresponding to one or more additional sequence indexes of the demodulation signal, to prevent automatic retransmissions of messages corresponding to the additional sequence indexes.

25. The base station node of claim 21, wherein the one or more processing circuits are configured to demodulate a portion of the uplink signal corresponding to the allocated uplink resources using propagation channel estimates corresponding to each of two or more selected sequence indexes of the demodulation reference signal, and are further configured to:
- selectively transmit an acknowledgement message or a negative acknowledgement message corresponding to each of the two or more selected sequence indexes, responsive to a successful or unsuccessful decoding of an uplink message using the corresponding propagation channel estimate, respectively; and
- transmit one or more acknowledgment messages corresponding to one or more additional sequence indexes of the demodulation signal, to prevent automatic retransmissions of messages corresponding to the additional sequence indexes.

26. The base station node of claim 21, wherein the one or more processing circuits are further configured to:
- transmit an uplink resource grant indicating a need for an adaptive re-transmission, responsive to an unsuccessful decoding of the message transmitted by one of the two or more mobile communication devices.

27. The base station node of claim 26, wherein the uplink resource grant includes a designated sequence index, and the one or more processing circuits are further configured to demodulate a subsequently received re-transmission according to the uplink resource grant using only a propagation channel estimate corresponding to the designated sequence index.

28. The base station node of claim 26, wherein the one or more processing circuits are further configured to demodulate a subsequently received re-transmission according to the uplink resource grant using propagation channel estimates corresponding to two or more sequence indexes of the demodulation reference signal.

* * * * *